United States Patent [19]
Hosoya

[11] Patent Number: 6,079,798
[45] Date of Patent: Jun. 27, 2000

[54] BRAKE PRESSURE CONTROL DEVICE

[75] Inventor: Yukio Hosoya, Hamakita, Japan

[73] Assignee: Nisshinbo Industries Inc., Tokyo, Japan

[21] Appl. No.: 09/041,179

[22] Filed: Mar. 12, 1998

[30] Foreign Application Priority Data

Mar. 26, 1997 [JP] Japan ..................................... 9-091680

[51] Int. Cl.[7] .................................................... B60T 8/36
[52] U.S. Cl. ............................... 303/119.3; 303/DIG. 10; 137/377; 137/884; 137/596.17
[58] Field of Search .............. 303/119.1, 119.2, 303/119.3, DIG. 10, 116.4; 251/129.15, 144; 417/505; 137/884, 377, 596.17

[56] References Cited

U.S. PATENT DOCUMENTS

| | | | |
|---|---|---|---|
| 1,193,036 | 8/1916 | McElroy | 137/596.17 |
| 4,842,525 | 6/1989 | Galloway et al. | 303/119.3 |
| 5,402,824 | 4/1995 | Hosoya et al. | 303/119.3 |
| 5,449,226 | 9/1995 | Fujita et al. | 303/119.3 |
| 5,466,055 | 11/1995 | Schmitt et al. | 303/119.3 |
| 5,522,424 | 6/1996 | Dalton, Jr. et al. | 137/884 |
| 5,823,507 | 10/1998 | Inden et al. | 303/119.2 |

*Primary Examiner*—Robert J. Oberleitner
*Assistant Examiner*—Thomas J. Williams
*Attorney, Agent, or Firm*—Arent Fox Kintner Plotkin & Kahn, PLLC

[57] ABSTRACT

A brake pressure control device having a reliable sealing effect which lengthens the life span of the electrical and electronic parts. The solenoid valve cover (30) includes a bowl-shaped cover housing (33) and a valve cover (34). The bottom surface (31) of the cover housing (33 is inserted over the valve assembly (21) of the solenoid valve (20) to attach to the installation surface (11) of the housing (10) of the hydraulic unit. The attaching device (23) of the coil assembly (22) is provided around the valve assembly (21) in the cover housing (33), and is commonly used for also attaching the cover housing (33).

8 Claims, 6 Drawing Sheets

BRAKE PRESSURE CONTROL DEVICE

BACKGROUND OF THE INVENTION

This invention relates to a brake pressure control device for a vehicle equipped with an anti-lock brake system (ABS), a traction control system (TCS), or other devices which electrically control the brake pressure of the wheels.

A conventional brake pressure device is explained with reference to FIG. 6. The conventional brake pressure device comprises a hydraulic unit and an electronic control unit (not shown in the diagram). The housing a of the hydraulic unit has a plural number of solenoid valves b, a fluid pressure pump, and the motor c to drive the pump.

Since each solenoid valve b is an electrical part, which may be damaged by moisture, it is covered by the bowl-shaped solenoid valve cover d. The opening side of the solenoid valve cover d is attached to the housing a and affixed by the bolt e.

Additionally, sealing material is provided on the opening side of solenoid valve cover d to secure a tight seal between the opening portion of the solenoid cover d and the housing a.

There are some difficulties in securing a sufficient sealing area at the opening portion of the solenoid valve cover.

Thus, sealability of the solenoid valve cover d depends upon the quality of the sealing materials. However, the sealing material generally deteriorates when it is used for hours or can be deteriorated by environmental changes. Therefore, the durability and reliability of the sealing in the conventional devices are some important points to be considered for improvement.

Deteriorated or damaged sealing causes water leakage from the abutting point between the opening of the solenoid valve cover d and the housing. The solenoid valves can rust or corrode as a result.

Also, as the solenoid valve cover d is placed on the two surfaces f, g of the housing in FIG. 6, difficulties in sealability increase as the number of abutting surfaces between the solenoid valve cover d and the housing increases.

With respect to conventional integral type devices where a control circuit board for controlling the electric parts is installed in a solenoid valve cover, the electronic components are apt to be damaged by water and are apt to malfunction.

Also, when affixing the solenoid-valve cover using bolts, the flat level area inside the cover decreases because of the hole which is formed on the periphery of the cover for inserting the bolt. Accordingly, the size of the control circuit board to be installed inside the cover becomes limited. The modern trend is to decrease the size of the device. Using conventional devices, however, further reduction of the size in the structure of the control circuit board is almost impossible because the bolt hole requires a certain area.

OBJECTS AND SUMMARY OF THE INVENTION

This invention is provided to improve on the above-described problems and is to provide a brake pressure control device which has the following effects.

It is an object of this invention to provide a brake pressure control device with an improved sealing effect which enables an increase in the life span of the electrical equipment and the electronic components.

It is another object of this invention to provide a brake pressure control device which facilitates the installation of the coil assembly.

It is another object of this invention to provide a brake pressure control device which enables a reduction in the size of the device.

This invention is a brake pressure control device comprising a hydraulic unit and an electronic control unit equipped with a control board, the hydraulic unit further comprising a plural number of solenoid valves in which a coil assembly is mounted externally around a valve assembly vertically provided in a housing of the hydraulic unit, a solenoid valve cover provided to cover the solenoid valves, a hydraulic pump, and a motor mounted to operate the hydraulic pump, in which fluid pressure is controlled through the operation of the solenoid valves and the motor of the hydraulic unit by the electronic control unit, wherein the solenoid valve cover includes a bowl-shaped cover housing and a valve cover provided to close an opening of the cover housing, a bottom portion of the cover housing protrudes through the valve assembly of the solenoid valve and attaches to an installation surface of the housing of the hydraulic unit, and in which an attaching means of the coil assembly mounted externally around the valve assembly inside the cover housing is also commonly used as an attaching means of the cover housing.

This invention can have a sealing material installed between a bottom surface of said cover housing and an installation surface of the housing abutting against the cover housing.

This invention can have the attaching means of the coil assembly be a grip ring attaching to the valve assembly of the solenoid valve.

This invention can have the electronic control unit and hydraulic unit be integrated by installing the control board in the cover housing of the solenoid valve and connecting a coil terminal extending from the solenoid valve with the control board.

This invention can include the electronic control unit further comprising a circuit board supporting device, a board cover closing the opening of the circuit board supporting device, and a control board supported by the circuit board supporting device, wherein the electronic control unit and hydraulic unit are integrated by installing the circuit board supporting device of the electronic control unit in the housing of the hydraulic unit and connecting the coil terminal and the control board by a relay conductor.

This invention can have the cover housing of the solenoid valve cover and the circuit board supporting device of the electronic control unit be integrated into one unit.

This invention can have a connecting terminal extending from a motor protruding through the housing of the hydraulic unit and the control board supporting device to connect to the control board.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Summary of Brake Pressure Control Device

The brake pressure control device of this invention comprises the hydraulic unit and the electronic control unit to control the hydraulic unit.

Figure 1:
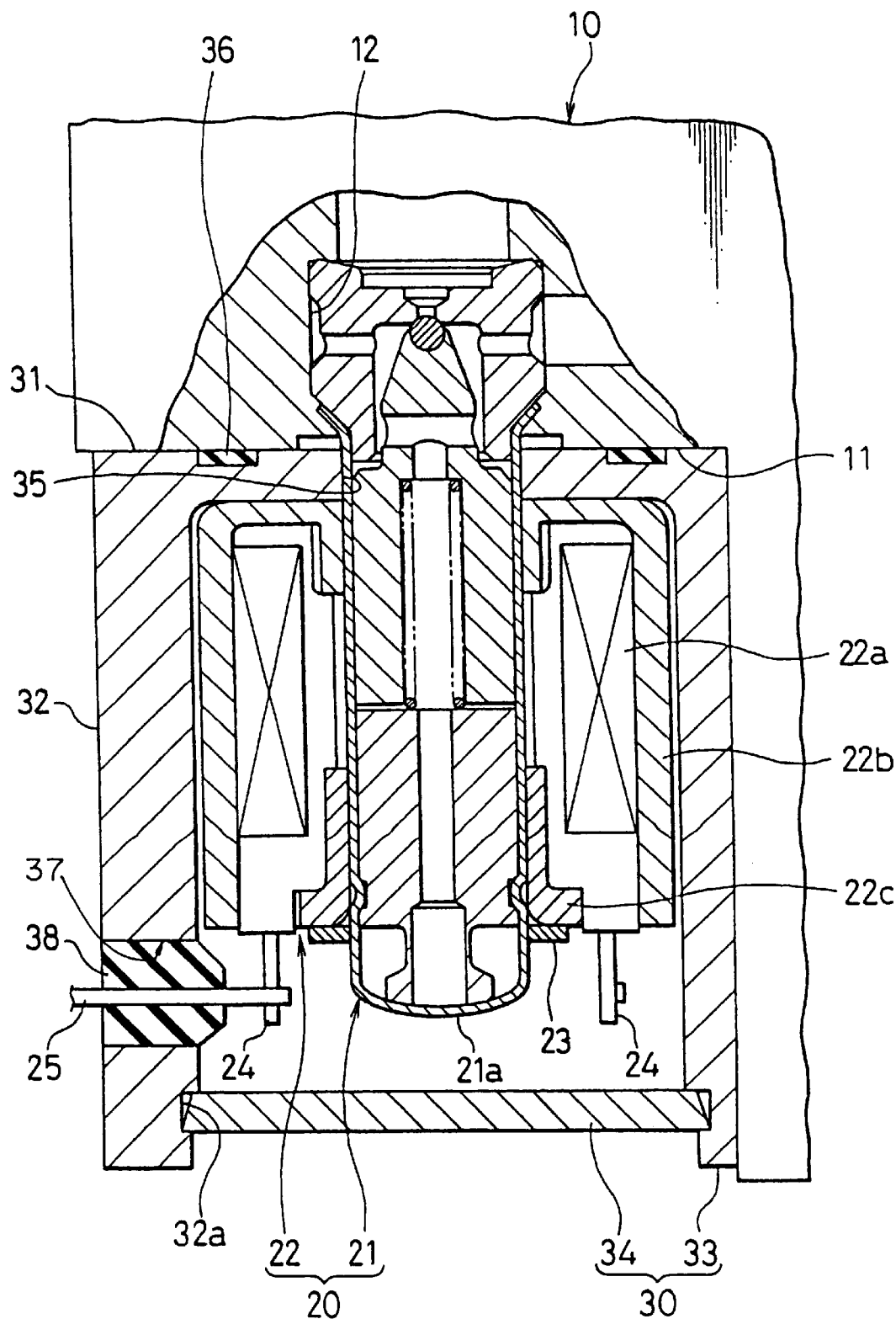
FIG. 1 is a partial vertical cross section view of the brake pressure control device according to the present invention.

In FIG. 1, the housing 10 of the hydraulic unit has the fluid pressure pump inside to be driven by the motor provided on the surface of the housing. A fluid passage is provided in the housing 10. The fluid pressure generated at the master cylinder is designed to be transferred to each wheel cylinder through the fluid passage. For that end, the wheel cylinder and the master cylinder are connected by the fluid line inside the housing 10.

In this embodiment, the housing 10 has a L-shaped portion. A plural number of the solenoid valves 20 are vertically installed at the installation surface 11. However, the solenoid valves may be installed sideways and the positions to be installed are not be limited to the description in this embodiment.

Each solenoid valve 20 comprises a dome-shaped valve assembly 21 and a ring coil assembly 22.

The valve assembly 21 has a valve system inside which is normally open or normally closed as the specific brake system requires. The valve system opens or closes by the electromagnetic force caused by applying electricity to the coil assembly 22. One end of the valve assembly 21 is installed in the bore 12 and is affixed to the installation surface 11 by caulking or other means.

The coil assembly 22 comprises coil 22a mounted externally around the sleeve 21a, and yoke 22b and yoke ring 22c mounted externally around the coil 22a. The coil assembly 22 is mounted externally around the sleeve 21a of the valve assembly 21. The coil assembly 22 is affixed by the grip ring 23 mounted at the upper portion of the sleeve 21a of the valve assembly 21.

This grip ring 23 also functions as an attaching means for the solenoid valve cover 30 described below.

Solenoid Valve Cover

In the conventional devices, the opening side of the solenoid valve cover contacts the housing while the opening side of the solenoid valve of this invention faces in the opposite direction.

In short, the solenoid valve cover 30 comprises the bowl-shaped cover housing 33, which has the bottom surface 31 and the side surfaces 32, and the valve cover 34 closing the opening of the cover housing 33. The bottom surface 31 side of the cover housing 33 attaches to the cover housing installation surface 11 of the housing 10. This structure is designed to provide a better sealing effect by increasing the contacting area of the solenoid valve cover 30 and the cover housing installation surface 11 of the housing 10 and to facilitate the assembly of the coil assembly 22.

To explain more specifically, the holes 35, through which the sleeve 21a of the valve assembly 21 may be inserted, are provided in the bottom surface 31 of the cover housing 33. The bottom surface 31 of the cover housing 33 is inserted over the sleeve 21a of each valve assembly.

More specifically, sealing material 36 is provided on the periphery of the bottom surface 31 of the cover housing 33 abutting against the installation surface 11. The sealing material 36 should be large enough to cover the whole valve assembly 21. The sealing material 36 covers and seals between the bottom surface 31 of the cover housing 33 and the installation surface 11. Since the bottom surface 31 of the cover housing 33 has a larger area than the other end of the opening portion of the cover housing 33, less expensive materials, which also facilitates assembly, can be used as the sealing material 36.

With respect to the traditional means for installing the solenoid valve cover 30, bolts or screws are used to install housing 10 of the hydraulic unit. However, this invention uses the grip ring 23 as the installation means.

In short, the coil assembly 22 is mounted externally around the sleeve 21a of the valve assembly 21 protruding inside the cover housing 33, and the grip ring 23 is installed on one end of the sleeve 21a to affix the coil assembly 22 and the cover housing 33 at the same time to the housing 10.

The hole 37 is formed at one portion of the side surface 32 of the cover housing 33, and the sealing material 38 is installed in the hole 37. The conductor 25 electrically connected to coil terminal 24 or terminal 24 protrudes through the sealing material 38 and extends to outside the cover to electrically connect to the control circuit board through a printed circuit board (not shown in the diagram) or a band conductor such as a harness. The elasticity of the sealing material 38 enables an effective sealing effect between the hole 37 and the sealing material 38 and between the conductor 25 and the sealing material 38.

The valve cover 34 is set in the groove 32a formed on the inner surface of the side surface of the cover housing 33, and an elastic sealing material (not shown in the diagram) can be set between the valve cover 34 and the cover housing 33, thereby securing the sealing effects.

A second embodiment of this invention is explained below. Those components which are the same as for the aforementioned embodiment are identified by the same symbols, and an explanation is omitted here.

Figure 2:
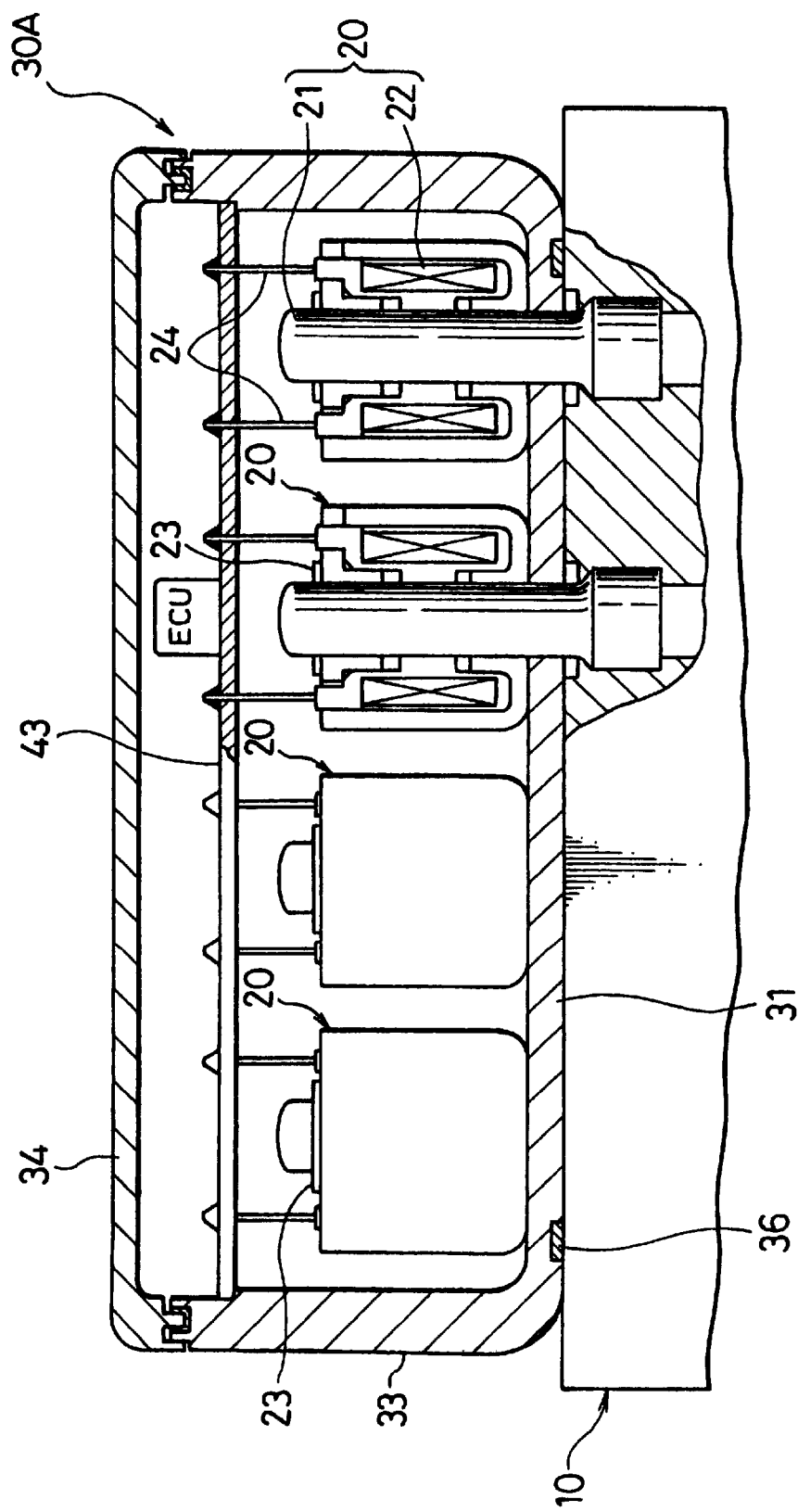
FIG. 2 illustrates another example of the integral type including the control board and the solenoid valve cover.

FIG. 2 is an example of the integral type in which the solenoid valve cover 30A includes the control board 43 of the electronic control unit.

The same descriptions of the aforementioned preferred embodiment 1 are applicable to where the bottom surface 31 of the cover housing 33 abuts against one portion of a side surface of the housing 10 of the hydraulic unit, the grip ring 23 is used to affix the coil assembly 22 and solenoid valve cover 30, and the valve cover 34 is used to cover and close the opening portion of the cover housing 33.

In this example, the control board 43 is supported by the cover housing 33 and is electrically connected to the coil terminal 24 of the solenoid valve 20.

Figure 3:
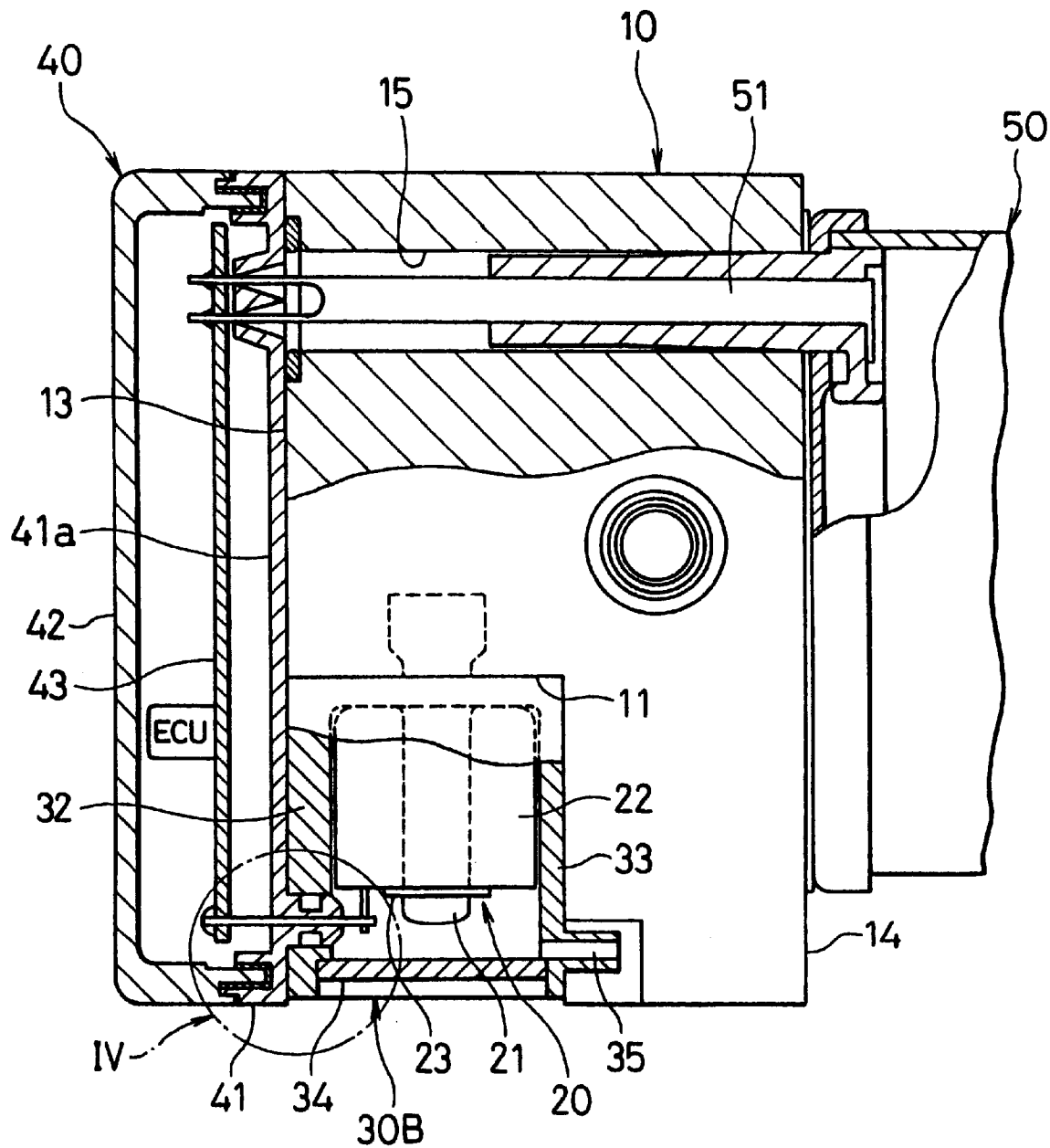
FIG. 3 illustrates another example of the integral type including the hydraulic unit and electronic control unit.

FIG. 3 shows a third embodiment which is an example of the integral type of brake pressure control device in which the housing 10 of the hydraulic unit includes the electronic control unit 40.

The electronic control unit 40 comprises the plate-shaped control board supporting member 41, the control board cover 42 closing the opening of the control board supporting member 41, and the control board 43 supported by the control board supporting member 41.

Figure 4:
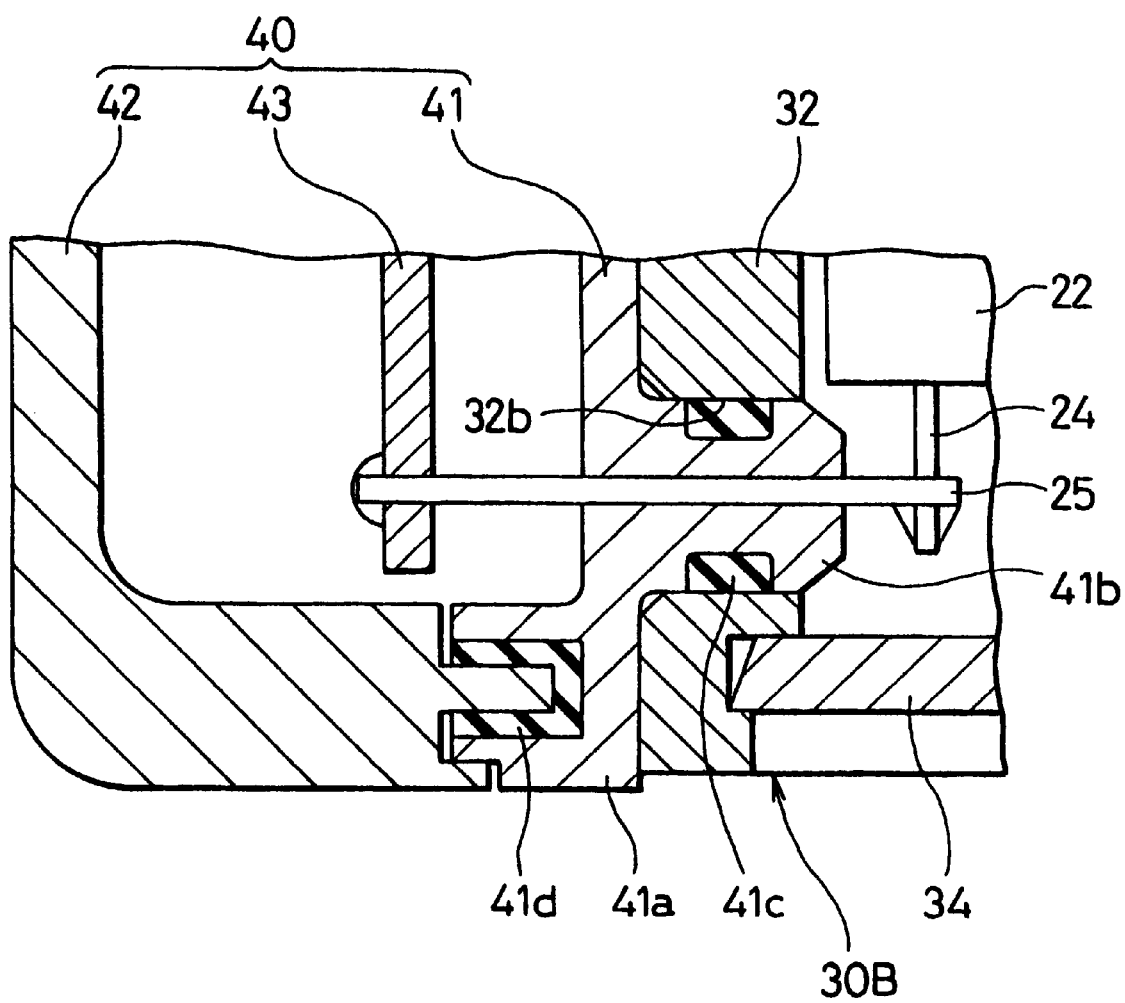
FIG. 4 is an enlarged view of the circle IV of FIG. 3.

The bottom surface 41a of the control board supporting member 41 is attached at the side surface 13 of the housing 10 in the hydraulic unit. A connecting protuberance 41b of the control board supporting member 41, which is protruding as described at the lower portion of the figure, is inserted into the connecting hole 32b formed in the side surface 32 of the cover housing 33 forming the solenoid valve cover 30B. FIG. 4 illustrates the enlarged diagram of the portion of the protuberance 41b and the connecting hole 32b. A seal 41c is attached on the outer surface of the connecting protuberance 41b, which secures the sealing effect of the connecting hole 32b. The conductor 25 extending from the coil assembly 22 protrudes through the connecting protuberance 41b and is electrically connected to the control board 43.

A bolt may be used to affix the control board supporting member 41 to the housing 10.

The connecting portion between the control board supporting member 41 and the control board cover 42 are shaped as concavo-convex mating surfaces. Sealing material 41d is provided on the entire surface of the opening side of the control board supporting member 41.

As shown in FIG. 3, the motor 50 is provided on the other side surface 14 of the housing 10 of the hydraulic unit. The connecting terminal 51 extending from the motor 50 is electrically connected to the control board 43 through the guiding hole 15 and the bottom surface 41a of the control board supporting member 41. A water vent 35 can be provided as shown in FIG. 3.

Figure 5:
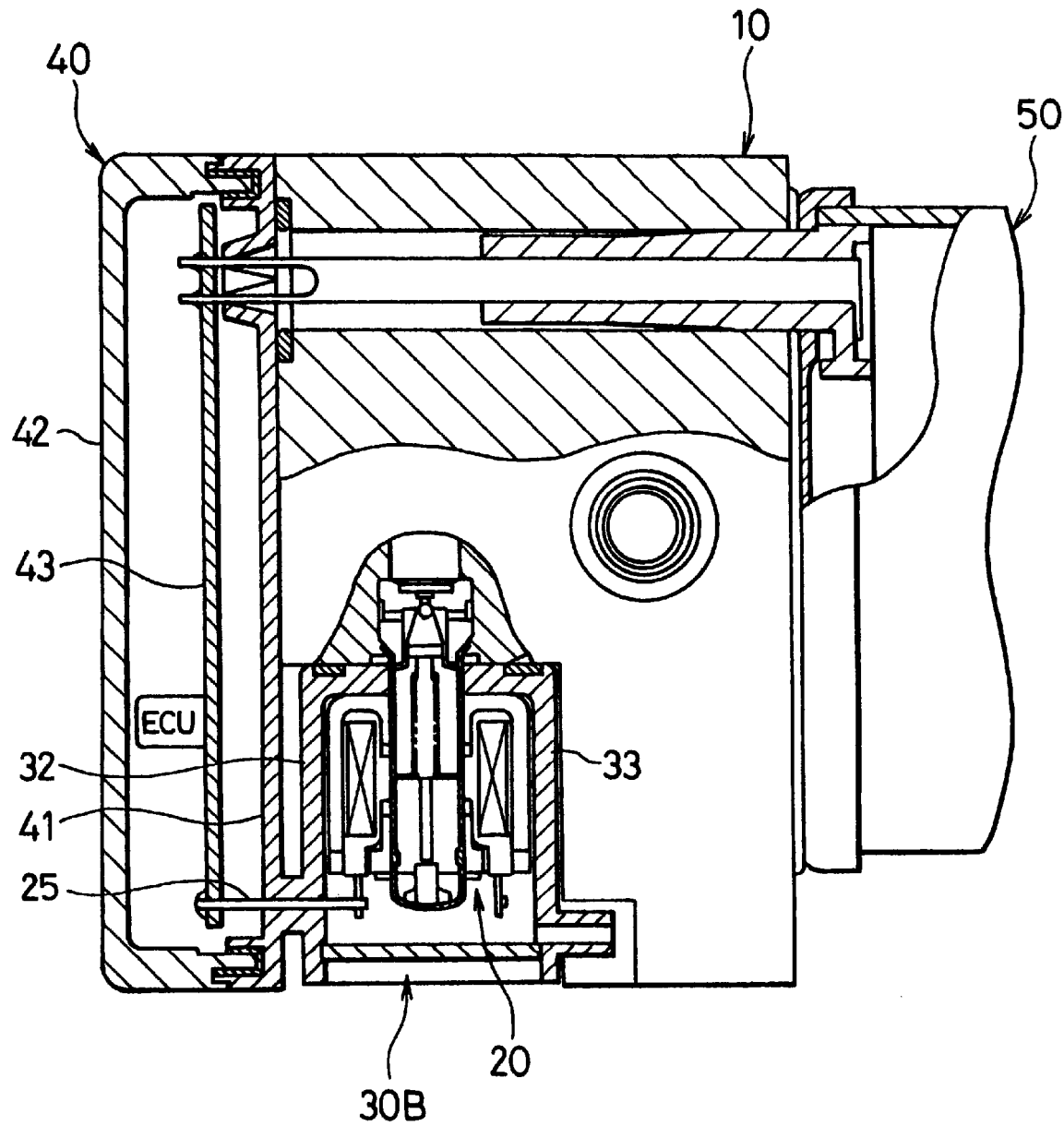
FIG. 5 illustrates another example of integration of the cover housing of the solenoid valve cover of FIG. 3 and the circuit board supporting device.
Figure 6:
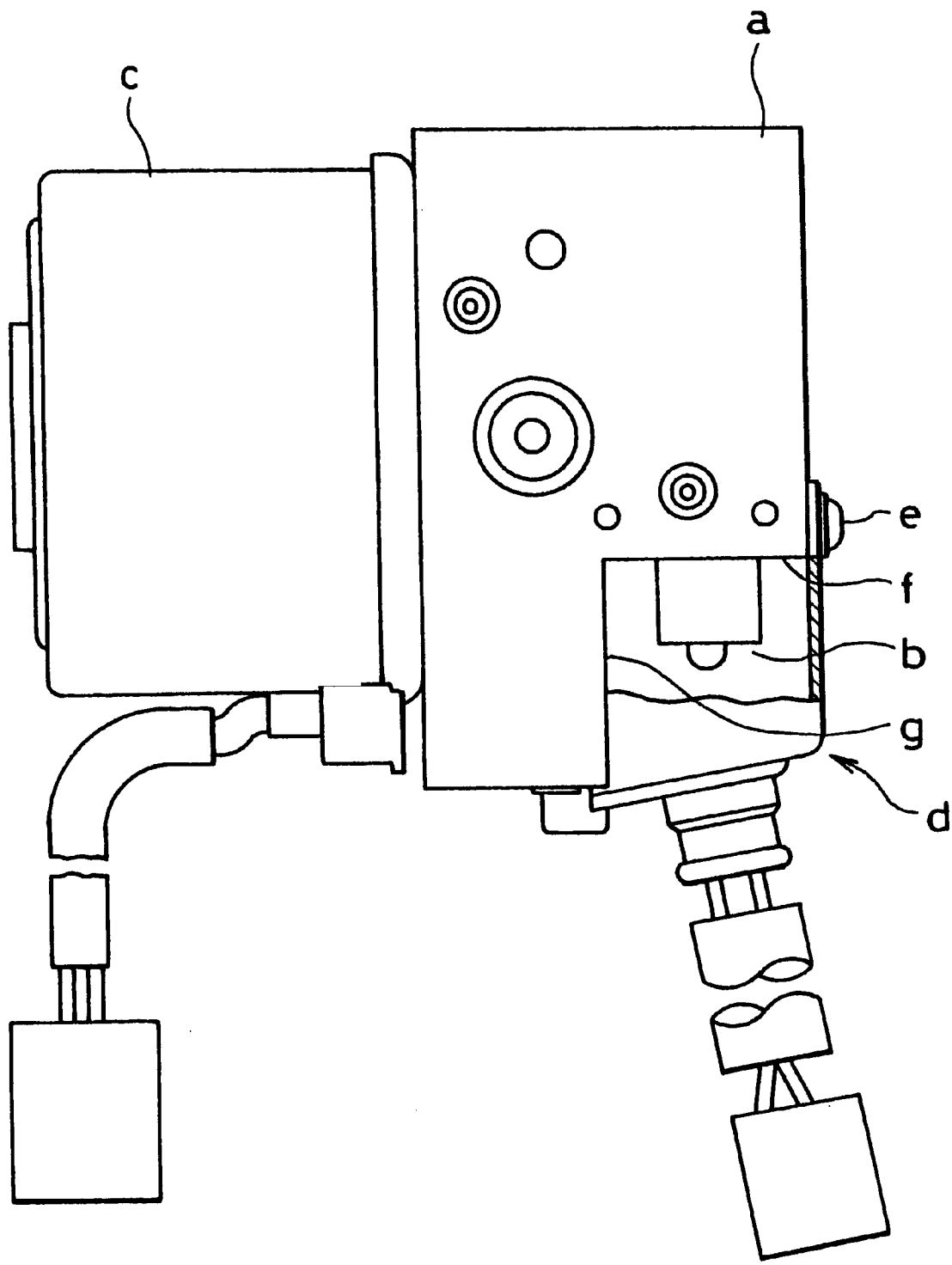
FIG. 6 is one example of a conventional cover for the solenoid valves.

In FIG. 3, the cover housing 33 of the solenoid valve cover 30B and the control board supporting member 41 of the electronic control unit 40 are separately structured. However, these, may be integrated in one unit as shown as a fourth embodiment in FIG. 5. The cover housing 33 communicates the control board supporting member 41 partially at the installation position of the conductor 25, those, however, may communicate at the entire length of the side surface 32 of the housing 33.

As explained above, this invention provides the following advancements or improvements.

The bottom surface of the solenoid valve cover is attached directly to the installation surface of the housing, thereby securing the larger sealing area. Accordingly, this invention provides an effective sealing effect of the abutting portion between the solenoid valve cover and housing and can provide a longer life span of the internal electrical parts such as a solenoid valve.

Since this invention secures a larger sealing area, the sealing material provided at the bottom surface of the solenoid valve cover is not limited to be formed in some particular shapes, thereby providing a sealing material with a great sealing effect for a lower cost.

Traditionally, a bolt is used to affix the solenoid valve cover. In this invention, an attaching means for the coil assembly 17 of the solenoid valve may commonly be used as an affixing means for the solenoid cover, thereby reducing the number of parts of the device as well as size of the device.

An integral type with the control board inside facilitates the lay out of the control board as well as eliminates the problems of mechanical trouble and malfunction caused by the water penetrating into the electronic control unit.

The coil assembly of the solenoid valve may be installed from the opening side of the solenoid valve cover which improves the assemblability.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A brake pressure control device comprising a hydraulic unit and an electronic control unit equipped with a control board, said hydraulic unit comprising a housing, a plural number of solenoid valves, each valve including a valve assembly vertically provided in said housing and a coil assembly mounted externally around each valve assembly, a solenoid valve cover provided to cover said solenoid valves, a hydraulic pump connected to said solenoid valves, a motor mounted to operate said hydraulic pump, in which a fluid pressure is controlled through the operation of said solenoid valves and said motor of the hydraulic unit by said electronic control unit, said solenoid valve cover including a bowl-shaped cover housing having an opening, a bottom portion, and a valve cover provided to close an opening of said cover housing, said valve assemblies of the solenoid valves protruding through said bottom portion of said cover housing, said bottom portion attaching to an installation surface of the housing of the hydraulic unit, and an attaching means for attaching said coil assembly mounted externally around said valve assembly inside the cover housing and for attaching said cover housing to said housing.

2. A brake pressure control device as claimed in claim 1, further comprising:

sealing material installed between a bottom surface of said bottom portion of said cover housing and said installation surface of said housing abutting against said cover housing.

3. A brake pressure control device as claimed in claim 1, wherein said attaching means of the coil assembly is a grip ring attaching said coil assembly to said valve assembly of the solenoid valve.

4. A brake pressure control device as claimed in any one of claims 1, 2, or 3, wherein said electronic control unit and hydraulic unit are integrated by installing said control board in the cover housing of the solenoid valve and connecting a coil terminal extending from said solenoid valve with said control board.

5. A brake pressure control device as claimed in any one of claims 1, 2, or 3, wherein said electronic control unit further comprises a circuit board supporting member having an opening, a board cover closing the opening of said circuit board supporting member, and a control board supported by said circuit board supporting member; and said electronic control unit and hydraulic unit are integrated by installing said circuit board supporting device of the electronic control unit in said housing of the hydraulic unit and connecting the coil terminal and the control board by a band conductor.

6. A brake pressure control device as claimed in claim 5, wherein said cover housing of the solenoid valve cover and said circuit board supporting member of the electronic control unit are integrated into one unit.

7. A brake pressure control device as claimed in claim 5, wherein a connecting terminal extending from said motor protrudes through said housing of the hydraulic unit and the control board supporting member to connect to said control board.

8. A brake pressure control device as claimed in claim 6, wherein a connecting terminal extending from said motor protrudes through said housing of the hydraulic unit and the control board supporting member to connect to said control board.

* * * * *